Oct. 22, 1963 R. J. MURPHY 3,107,398
MULTIPLE-UNIT POWER ACTUATED MOVERS FOR
TELESCOPING GYMNASIUM SEAT-STRUCTURES
Filed July 14, 1958 7 Sheets-Sheet 1

INVENTOR.
RAYMOND J. MURPHY
BY
Alfred W. Petchaft
ATT'Y.

Oct. 22, 1963　　R. J. MURPHY　　3,107,398
MULTIPLE-UNIT POWER ACTUATED MOVERS FOR
TELESCOPING GYMNASIUM SEAT-STRUCTURES
Filed July 14, 1958　　　　　　　　7 Sheets-Sheet 2

INVENTOR.
RAYMOND J. MURPHY
BY
ATT'Y.

Oct. 22, 1963 R. J. MURPHY 3,107,398
MULTIPLE-UNIT POWER ACTUATED MOVERS FOR
TELESCOPING GYMNASIUM SEAT-STRUCTURES
Filed July 14, 1958 7 Sheets-Sheet 6

INVENTOR.
RAYMOND J. MURPHY
BY
*Alfred W. Petchoft*
ATT'Y.

FIG. 13

INVENTOR.
RAYMOND J. MURPHY
BY
ATT'Y.

United States Patent Office 3,107,398
Patented Oct. 22, 1963

3,107,398
MULTIPLE-UNIT POWER ACTUATED MOVERS FOR TELESCOPING GYMNASIUM SEAT-STRUCTURES
Raymond J. Murphy, Bonne Terre, Mo., assignor, by mesne assignments, to Medart Lockers, Inc., a corporation
Filed July 14, 1958, Ser. No. 748,199
3 Claims. (Cl. 20—1.126)

This invention relates in general to certain new and useful improvements in gymnasium equipment, and more particularly, to a multiple-unit power actuated mover for telescoping gymnasium seating-structures and the like.

Because of space requirements and the need to afford maximum utility, it has become common practice, in school gymnasiums and similar auditoriums, to employ so-called telescoping seating-structures. Such structures ordinarily consist of a plurality of strong steel-work frames which nest one within the other and carry horizontal seat-boards and foot-boards in suitably spaced relation to provide a tier of bleacher-like seats. When in "closed" position, the entire structure is telescoped compactly against the wall and extends outwardly into the gymnasium only a short distance and the seat-boards, together with the associated foot-boards, lie in vertically spaced relation one above the other. Obviously, the length and height of these seating-structures vary, depending upon the design of the manufacturer and the requirements of the particular gymnasium involved in the installation. For example, such structures ordinarily range in length from twelve to eighteen feet in length, although, occasionally, longer and shorter sections are used. Similarly, such structures range from six or seven tiers of seat-boards up to twenty-four tiers, depending upon the size of the gymnasium. Furthermore, a gymnasium installation usually involves a number of such sections arranged in side-by-side order along one or more walls of the building.

It is, of course, apparent that seating-structures of this type must be strong in order to support the total weight of the number of persons who will be seated thereon and to withstand the live loads resulting from movement. Consequently, telescoping seating-structures are quite heavy and the combined efforts of several workmen are required to move them from open to closed positions. In addition, one workman usually pulls with either greater or lesser force than his co-workers, with the result that the structure will not be pulled out in a straight line so as to be truly perpendicular to the wall upon which the seating-structure is attached. Consequently, when the next adjacent seating-structure is pulled out, there will be marginal interference between the two seating-structures.

It is, therefore, the primary object of the present invention to provide a power driven device for simultaneously moving a plurality of side-by-side telescoping gym seats into open and closed positions.

It is another object of the present invention to provide a gym seat mover of the type stated which can readily be adapted for use with, or attached to, various different types of existing telescoping gymnasium seat-structures which are arranged in side-by-side order along a gymnasium wall.

It is a further object of the present invention to provide a gym seat mover which eliminates the need for individual moving devices for each of a plurality of side-by-side connected telescoping seating structures.

It is also an object of the present invention to provide a gym seat mover of the type stated having a pair of spaced units each comprising a plurality of telescoping sections, the sections in each unit being articulated with respect to each other in a very simple, economical and highly efficient manner.

It is an additional object of the present invention to provide a gym seat mover of the type stated in which the units are so connected and arranged that they can be simultaneously shifted from closed to open position or open to closed position at a relatively rapid rate with a minimum of power loss due to friction and similar inefficiencies.

It is a further object of the present invention to provide a gym seat mover in which a single mover unit can simultaneously open and close a plurality of side-by-side telescoping bleachers.

With the above and other objects in view, my invention resides in the novel features of form, construction, arrangement, and combination of parts presently described and pointed out in the claims.

In the accompanying drawings (seven sheets)—

Referring now in more detail and by reference characters to the drawings, which illustrate a preferred embodiment of the present invention, A designates a telescoping seat-structure or bleacher which includes a main or rear upright frame 1 consisting of a suitable plurality of transversely spaced oblong rectangular panels 2, each, in turn, being cross-connected at their upper ends by means of a connecting plate 3. Adjacent their lower ends, the panels 2 are cross-connected by a formed channel plate 4 which is welded, riveted, or otherwise rigidly attached thereto and the panels 2 are likewise cross-connected by an angle member 5.

Mounted upon the upper end of, and extending horizontally between the panels 2, is a seat-board 6 and similarly mounted directly beneath, and extending along, the seat-board is a fascia board 7. At their lower ends, each of the panels 2 is rigidly welded to a horizontal foot-forming frame 8, which is adapted to rest directly upon the gymnasium floor f so that, when each of the panels 2 is rigidly attached to a conventional gymnasium wall or similar masonry structure B, by means of conventional tie bolts 9, the entire rear frame 1 will be rigid, permanent, and stationary.

Hingedly secured to each of the panels 2, in downwardly spaced relation to the seat-board 6, is a forwardly extending horizontal element or beam 10 for slidable track-forming engagement within a slide-fitting 11, which is, in turn, rigidly welded to the upper end of an auxiliary panel 12, substantially similar to the panel 2 previously described. Welded to and extending upwardly from the forward end of the beam 10 is a seat-mounting plate 13 for supporting a seat-board 14 and a fascia board 15, the latter being substantially similar to the previously described seat-board 6 and fascia board 7. Also bolted or otherwise suitably secured to the upper side of the beam 10 and located below and between the seat-boards 6, 14, is a foot-board 16. Thus, when the seating-structure is in operative use, a spectator may be seated upon the seat-board 6 and rest his feet upon the foot-board 16 directly below and in front of the fascia board 7, the proportions of these members being such as to form a comfortable seat for the average adult. It will, of course, be understood in this connection that these seat dimensions are ordinarily used in gymnasiums associated with high schools, junior colleges and similar institutions where young men and women and adults will constitute the body of spectators. If the seating-structure is designed for use in elementary or primary schools where children will be the spectators, it is possible to make the dimensions of the entire structure somewhat smaller to accommodate the smaller users.

Each of the panels 12 corresponds to one of the panels 2 and there are, of course, a similar plurality of such panels 12, each being provided with an angle member 5 cross-connected in the same manner as the panels 2. At their lower ends, each of the panels 12 is welded rigidly to a horizontal under-frame carriage 17 preferably of the type disclosed in the copending application of George R. Chervenka, Serial No. 346,870, filed April 6, 1953, now Patent No. 2,870,492, dated January 27, 1959, thereby forming a first sliding or telescoping frame 16'.

Figure 1:
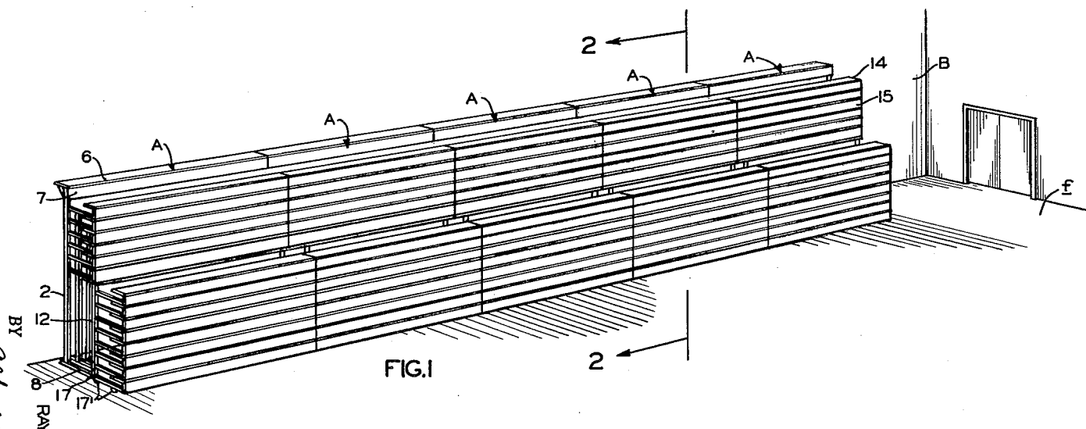
FIG. 1 is a fragmentary perspective view of a gymnasium provided along one wall with a plurality of telescoping gym seats equipped with a gym seat mover constructed in accordance with and embodying the present invention.
Figures 2, 9:
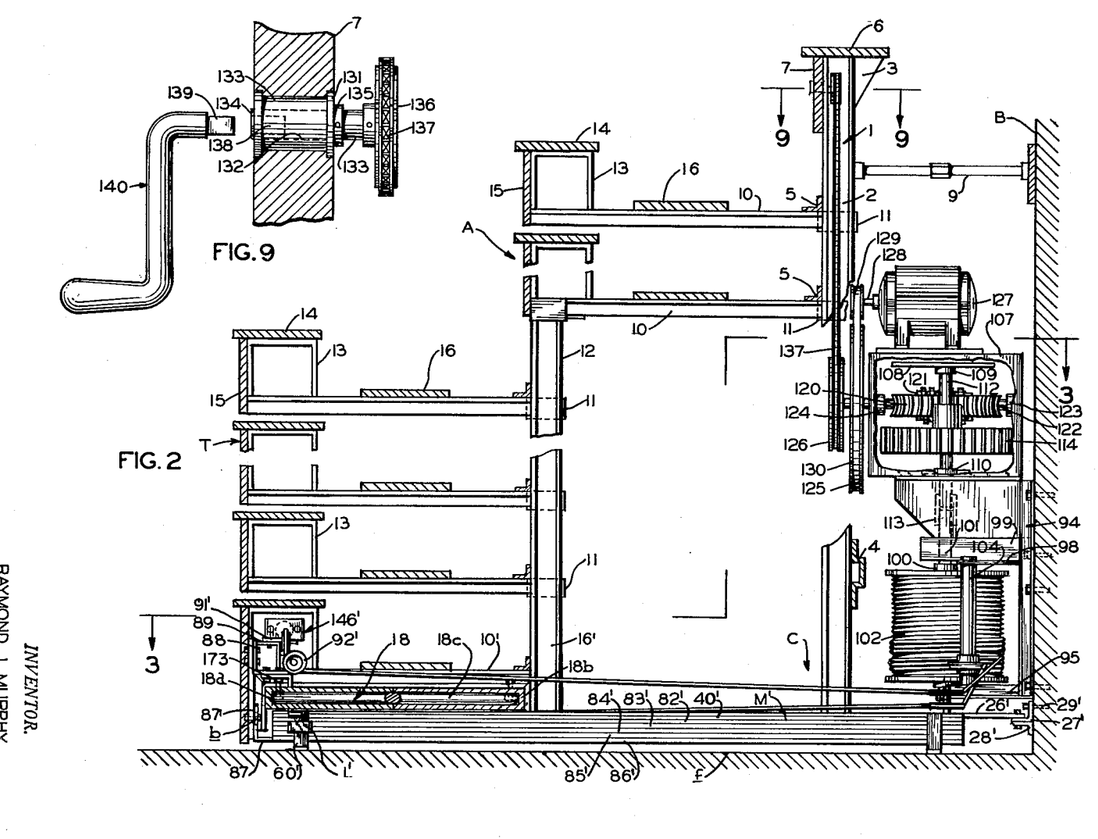
FIG. 2 is a sectional view taken along line 2—2 of FIG. 1.
FIG. 9 is a fragmentary sectional veiw taken along line 9—9 of FIG. 2.

As will be seen by reference to FIGS. 1 and 2, the seating-structure A consists of a plurality of substantially identical frames 16', each including a plurality of laterally aligned panels 12 formed by and having a seat-board 14, a fascia board 15, and a foot-board 16, all supported upon an under-frame carriage 17 and laterally connected by tie channels 4 and angle members 5. Each frame 16' may include any number of laterally spaced panels 12, depending upon the length of the seating-structure and, similarly, any number of frames 16' may be employed, depending upon the number of seats desired and the height to which the structure is to be carried. There is, of course, a reasonable and practical limit of height, but, in actual installations, it has been found that it is possible to fabricate seating-structures of the present invention with at least as many as twenty-one tiers rising to an overall height at the wall of approximately nineteen feet. Moreover, a plurality of seating-structures A are each attached to the gymnasium wall B and are arranged in side-by-side order therealong as seen in FIG. 1. In the present example, five seating-structures A are illustrated but it should be understood that a greater or lesser number of seating-structures A may be disposed along the wall B. Bolted or otherwise rigidly secured to the lowermost beams 10' and extending transversely thereof is a truss-like member 18 comprising spaced parallel U-shaped end channels 18a, 18b which are cross-connected by a series of rods or struts 18c. Thus, the member 18 rigidly cross-connects all of the side-by-side seating-structures A adjacent the forward ends thereof, and for purposes presently more fully appearing.

Each under-frame carriage 17 includes a plurality of rollers 17' which rest upon the gymnasium floor. When the telescopic seating-structures A are unloaded, each of the panels 2 and its related structure will be resiliently held upwardly with respect to the floor so each seating-structure A will roll freely inwardly and outwardly. However, when appreciable weight, such as the weight of a spectator, is brought to bear on the structures, then each structure will shift downwardly a short distance with respect to the rollers 17' and come to rest immovably in stationary position on the floor so that the weight of the spectators will, thus, be carried through the panels 2, 12, into the under-frame carriages 17, which, in turn, rest directly upon the floor.

Provided for cooperation with the side-by-side seating-structures A is a so-called seat mover C which comprises a pair of substantially identical, spaced mover units M, M'. The mover unit M comprises an elongated rectangular guide frame 19 formed of relatively strong structural frame members and including two parallel side rails 20, 21 provided with downwardly projecting vertical flanges 22, 23, respectively, and being connected at their ends by transversely extending horizontal end plates 24, 25, the latter being rigidly joined to a rearwardly extending connecting plate 26. The connecting plate 26 is bolted to angle members 27, 28 which are, in turn, secured to the wall B by anchor bolts 29. At suitable spaced locations along their lengths, the side rails 20, 21 are rigidly provided with downwardly projecting slide blocks 30, 31 having downwardly presented horizontal slide faces 32, 33 and the flanges 22, 23 are similarly provided with inwardly projecting matching slide blocks 34, 35 having inwardly presented vertical slide faces 36, 37. Also rigidly mounted on, and projecting inwardly from, the flanges 22, 23 are stop-forming studs 38, 39, the studs 38, 39, being axially aligned crosswise of the guide frame 19, for purposes presently more fully appearing.

Slidably telescoped within the guide frame 19 is an elongated first extensible rectangular frame 40 which is similar in shape and construction to said guide frame 19 and comprises two parallel side rails 41, 42, having downwardly projecting vertical flanges 43, 44, respectively, and being connected at their forward and rearward ends by transversely extending horizontal end plates 45, 46. At suitably spaced locations along its length, the side rails 41, 42 are provided with downwardly projecting slide blocks 47, 48 and the flanges 43, 44 similarly provided with inwardly projecting matching slide blocks 49, 50. The upwardly presented faces of the side rails 41, 42, bear slidably against the slide faces 32, 33, and the outwardly presented lateral faces of the flanges 43, 44, bear slidably against the slide faces 36, 37, respectively, on the slide blocks 34, 35. Finally, the flanges 43, 44, are respectively provided, at their rearward ends, with laterally outwardly projecting stop abutments 53, 54, which are in line with and abut against the studs 38, 39, respectively, on the guide frame 19 when the extensible frame 40 is shifted outwardly with respect to the guide frame 19. Also rigidly mounted on and projecting inwardly from the flanges 43, 44 are stop-forming studs 55, 56 which are similar to and for the same purpose as the studs 38, 39, previously described.

The guide frame 19 is provided at its four corners with depending plates 57, 58, 59, 60, which are welded or otherwise suitably secured to the flanges 22, 23, and terminate at the lower ends in outwardly projecting floor-contacting feet 61, 62, 63, 64. Similarly, the first extensible frame 40 is provided at its four corners with depending plates 65, 66, 67, 68 which are welded or otherwise suitably secured to the flanges 43, 44, and at their lower ends the depending plates 65, 66, 67, 68 are provided with spindles 69, 70, 71, 72 for rotatably supporting floor-contacting rollers 73, 74, 75, 76. In this connection it should be noted that the spindles 69, 70, 71, 72, and associated rollers 73, 74, 75, 76 are relatively narrow in the transverse direction so as to lie conveniently and without interference within the space between the flanges 22, 23 and the flanges 43, 44 and are of proper vertical height so as to support the extensible frame 40 in substantially horizontal nested position symmetrically within the guide frame 19.

Operatively mounted on the upper face of the end plate 25 intermediate the side rails 20, 21 is a pair of pulleys 77, 78, and also operatively mounted on the downwardly presented face of the end plate 24 approximately midway between the longitudinal center line of the guide frame 19 and the side rail 21 is forward horizontal pulley 79. Similarly, the extensible frame 40 is provided with forward and rearward horizontal pulleys 80, 81. The rearward pulley 81 is located on the upper face of the end plate 46 approximately midway between the side rail 41 and the longitudinal center line of the extensible frame 40, and the forward pulley 80 is located on the downwardly presented face of the end plate 45 in line with the rear pulley 81.

The next succeeding extensible frames 82, 83, 84, 85, 86 are similar in shape and construction to the extensible frame 40, and, therefore, corresponding parts in the extensible frames 82, 83, 84, 85, 86 are designated by the same reference numerals used in the extensible frame 40. In the present embodiment of the invention six extensible frames are shown but it should be understood that a greater or lesser number may be used depending upon the number of tiers in the seating-structures A and the depth of the tiers when extended. Moreover, at each of the corners of the extensible frames 40, 82, 83, 84, 85, 86 the roller assemblies are located in laterally aligned position when the several extensible frames are in nested position and are of such dimension in the transverse direction as to move in laterally spaced parallel paths without interference with each other when the several frames are shifted outwardly and inwardly. Furthermore, the sixth or forwardmost extensible frame 86 is provided with a single rearward pulley 81 located on the upper face of the rear end plate 42 approximately midway between the side rail 42 and the longitudinal center line of the frame 86.

The mover unit M' comprises an elongated rectangular guide frame 19' formed of relatively strong structural frame members and including two parallel side rails 20', 21', provided with downwardly projecting vertical flanges 22', 23', respectively, and being connected at their ends by a transversely extending horizontal end plates 24', 25', the latter being rigidly joined to a rearwardly extending connecting plate 26'. The connecting plate 26' is bolted to angle members 27', 28', which are, in turn, secured to the wall B by anchor bolts 29'. At suitable spaced locations along their lengths, the side rails 20', 21', are rigidly provided with downwardly projecting slide blocks 30', 31' having downwardly presented horizontal slide faces 32', 33' and the flanges 22', 23' are similarly provided with inwardly projecting matching slide blocks 34', 35' having inwardly presented vertical slide faces 36', 37'. Also rigidly mounted on, and projecting inwardly from, the flanges 22', 23' are stop-forming studs 38', 39', the studs 38', 39' being axially aligned crosswise of the guide frame 19', for purposes presently more fully appearing.

Slidably telescoped within the guide frame 19' is an elongated first extensible rectangular frame 40' which is similar in shape and construction to said guide frame 19' and comprises two parallel side rails 41', 42', having downwardly projecting vertical flanges 43', 44', respectively, and being connected at their forward and rearward ends by transversely extending horizontal end plates 45', 46'. At suitably spaced locations along its length, the side rails 41', 42' are provided with downwardly projecting slide blocks 47', 48' and the flanges 43', 44' are similarly provided with inwardly projecting matching slide blocks 49', 50'. The upwardly presented faces of the side rails 41', 42', bear slidably against the slide faces 32', 33', and the outwardly presented lateral faces of the flanges 43', 44', bear slidably against the slide faces 36', 37', respectively, on the slide blocks 34', 35'. Finally, the flanges 43', 44', are respectively provided, at their rearward ends, with laterally outwardly projecting stop abutments 53', 54', which are in line with and abut against the studs 38', 39', respectively, on the guide frame 19' when the extensible frame 40' is shifted outwardly with respect to the guide frame 19'. Also rigidly mounted on and projecting inwardly from the flanges 43', 44' are stop-forming studs 55', 56' which are similar to and for the same purpose as the studs 38', 39', previously described.

The guide frame 19' is provided at its four corners with depending plates 57', 58', 59', 60' which are welded or otherwise suitably secured to the flanges 22', 23', and terminate at the lower ends in outwardly projecting floor-contacting feet 61', 62', 63', 64'. Similarly, the first extensible frame 40' is provided at its four corners with depending plates 65', 66', 67', 68' which are welded or otherwise suitably secured to the flanges 43', 44', and at their lower ends the depending plates 65', 66', 67', 68' are provided with spindles 69', 70', 71', 72' for rotatably supporting floor-contacting rollers 73', 74', 75', 76'. In this connection it should be noted that the spindles 69', 70', 71', 72' and associated rollers 73', 74', 75', 76' are relatively narrow in the transverse direction so as to lie conveniently and without interference within the space between the flanges 22', 23' and the flanges 43', 44' and are of proper vertical height so as to support the extensible frame 40' in substantially horizontal nested position symmetrically within the guide frame 19'.

Operatively mounted on the upper face of the end plate 25' intermediate the side rails 20', 21' is a pair of pulleys 77', 78', and also operatively mounted on the downwardly presented face of the end plate 24' approximately midway between the longitudinal center line of the guide frame 19' and the side rail 21' is forward horizontal pulley 79'. Similarly, the extensible frame 40' is provided with forward and rearward horizontal pulleys 80', 81'. The rearward pulley 81' is located on the upper face of the end plate 46' approximately midway between the side rail 41' and the longitudinal center line of the extensible frame 40', and the forward pulley 80' is located on the downwardly presented face of the end plate 45' in line with the rear pulley 81'.

The next succeeding extensible frames 82', 83', 84', 85', 86' are similar in shape and construction to the extensible frame 40', and, therefore, corresponding parts in the extensible frames 82' 83', 84', 85', 86' are designated by the same reference numerals used in the extensible frame 40'. It will, of course, be apparent that the number of extensible frames in the mover unit M' is equal to that in the mover unit M, previously described. Moreover, at each of the corners of the extensible frames 40', 82', 83', 84', 85', 86', the roller assemblies are located in laterally aligned position when the several extensible frames are in nested position and are of such dimension in the transverse direction as to move in laterally spaced parallel paths without interference with each other when the several frames are shifted outwardly and inwardly. Furthermore, the sixth or forwardmost extensible frame 86' is provided with a single rearward pulley 81' located on the upper face of the rear end plate 42' approximately midway between the side rail 42' and the longitudinal center line of the frame 86'.

The forwardmost extensible frames 86, 86' are secured directly, respectively, to the forwardmost or bottom tier T of the seating-structures adjacent to and on either side of the center seating-structure A by similar fittings 87 having elongated slots 87' which engage bolts b as shown in FIG. 2. This type of connection will transmit horizontal pushing and pulling forces to the bottom tiers T of the seating-structures without any appreciable lost motion but will, at the same time, permit relative movement between each tier T and the fittings 87 to allow for unevenness in the floor. Similarly, the several extensible frames in each mover unit M may slide vertically with respect to each other along the vertical slide blocks 34, 35, 49, 50, 34′, 35′, 49′, 50′, to allow a reasonable degree of freedom in the vertical direction and also to compensate for unevenness in the floor and similar difficulties encountered during installation.

Bolted or otherwise rigidly secured to the lowermost beams 10′ of each of the seating-structures A to which the forwardmost extensible frames 86, 86′ are attached, are transverse channels 88, 89 provided with brackets 90, 91, 90′, 91′ for operatively supporting pulleys 92, 93, 92′, 93′.

Bolted to the gymnasium wall B and intermediate the panels 2 of the center seating-structure A is an upstanding frame 94 provided with a horizontal base 95 including a channel portion 96 having a thrust bearing 97 mounted therein. Also provided on the frame 94 in upwardly spaced relation to the base 95 is a horizontal support 98 which includes a channel portion 99, the latter having a bearing welded thereon, and journalled in the bearings 97, 100 is a vertical drum shaft 101 upon which is mounted a drum 102. Rigidly secured at its opposite ends in the base 95 and horizontal support 98 on either side of the drum 102 is a pair of vertical rods 103, 104 for operatively supporting pulleys 105, 106 which are axially shiftable therealong. Bolted to the upper end of the upstanding frame 94 is a transmission housing 107 provided internally thereof with a bearing support plate 108, and secured to the bearing support plate 108 is a bearing 109 which is aligned with a bearing 110 welded to and projecting upwardly from the bottom wall 111 of the housing 107. Rotatably mounted in the bearings 109, 110 is a shaft 112 which projects downwardly through the bottom wall 111 coaxially with the drum shaft 101 and is joined to the drum shaft 101 by a shaft coupling 113.

Rigidly mounted on the shaft 112 intermediate the bearings 109, 110 is a gear 114. Also mounted within the housing 107 is a bearing holder 115 for mounting a bearing 116 which is aligned with a bearing 117 secured to the bearing support plate 108, and journalled in the bearings 116, 117 is a shaft 118 provided with a pinion 119 which meshes with the gear 114. Also mounted on the shaft 118 adjacent the pinion 119 is a worm wheel 120 which is driven by a worm 121, the latter being mounted on a worm shaft 122 which is journalled within the housing 107 in spaced bearings 123, 124 and extends at right angles to the shaft 118. The worm shaft projects outwardly of the housing 107 and is provided with a large diameter pulley 125 and a sprocket 126. Mounted on the upper face of the housing 107 is an electric motor 127 having a motor shaft 128 provided with a small diameter pulley 129 which is in alignment with the pulley 125, and trained around the pulleys 125, 129 is a drive belt 130.

Mounted in the fascia board 7 in substantial vertical alignment with the worm shaft 122 is a bushing 131 provided with a central bore 132 for rotatably mounting a stub shaft 133. On either side of the bushing 131 the stub shaft 133 is provided with retaining collars 134, 135 and, as seen by reference to FIG. 9, the stub shaft 133 extends rearwardly of the fascia board 6 and has a sprocket 136 mounted thereon which is aligned with the sprocket 126. Trained around the sprockets 126, 136 is a roller chain 137. The stub shaft is, furthermore, provided with a forwardly opening square socket 138 for removably receiving the companion shaped end 139 of a crank 140. Thus, if electric current for the motor 127 is unavailable, the end 139 of the crank 140 may be inserted in the socket 138 and rotated so as to drive the worm shaft 122 and thereby rotate the drum 102.

Also bolted or otherwise mounted on the bottom tier T of each of the seating-structures A to which the extensible frames 86, 86′ are attached are plates 141, 141′ for mounting eyelets 142, 142′ and rigidly fastened at one end, respectively, to the eyelets 142, 142′ is a pair of multi-strand cables or prestressed wire ropes 143, 144. The cable 143 extends rearwardly and is trained around the forward and rearward pulleys 80, 81 of each extensible frame in the mover unit M in a continuous serpentine pattern, and is also trained around the pulleys 79, 77 in the guide frame 19. Furthermore, the cable 143 is wound a number of times around the drum 102, and from the drum 102, the cable 143 is trained around the pulleys 77′, 92′, 93′, and is connected at its other end to the cable thimble 145′ of a slack take-up device 146′.

Similarly, the cable 144 extends rearwardly and is trained around the forward and rearward pulleys 80′, 81′ of each extensible frame in the mover unit M′ in a continuous serpentine pattern, and is also trained around the pulleys 79′, 78′ in the guide frame 19′. Furthermore, the cable 144 is trained around the pulley 105 and is wound a number of times around the drum 102 in a direction opposite to that of the cable 143, and from the drum 102 the cable 144 is trained around the pulley 106, the pulleys 78, 92, 93, and is connected at its other end to the cable thimble 145 of a slack take-up device 146, which is identical to the slack take-up device 146′.

Each of slack take-up devices 146, 146′ include a main bracket 147 and guide-forming brackets 148, 149, each guide-forming bracket having a depending flange 148f and 149f giving additional support to each of said guide-forming brackets, which are bolted to the channels 88, 89. The brackets 147, 148, 149 are provided with two pairs of aligned holes 150, 151, 152, 153 for slidably receiving a pair of spaced parallel rods 154, 155 which are each threaded on one end. Secured to the threaded ends of the rods 154, 155 by means of bolts 156, 157 is an end plate 158, and integrally joining the other ends of the rods 154, 155 is a tension plate 159 provided with an eyelet 160 which holds the cable thimble 145. Also integrally formed with the tension plate 159 is a take-up rod 161 which slidably projects through a central hole 162 in the main bracket 147, and formed in the take-up rod 161 is a plurality of notches 163. Welded or otherwise rigidly secured to the main bracket 147 and end plate 158 are aligned hollow tubular spring supports 164, 165, and encircling the spring supports 164, 165 is a heavy compression spring 166 which bears endwise against the main bracket 147 and end plate 158. Projecting outwardly from the main bracket 147 on either side of the take-up rod 161 is a pair of spaced parallel ears 167, 168 provided with aligned pins 169, 170 for rockably supporting a U-shaped pawl 171 which is biased downwardly into engagement with any one of the notches 163 by a spring 172, the latter being connected at its opposite ends to the pawl 171 and main bracket 147. Thus, when slack develops in the cables 143, 144 the spring 166 in each take-up device 146, 146′ will push the take-up rod 161 one or more notches in the direction of the guide-forming brackets 148, 149 but the spring biased pawl 171 will prevent return movement of the take-up rod 161.

Figure 3:
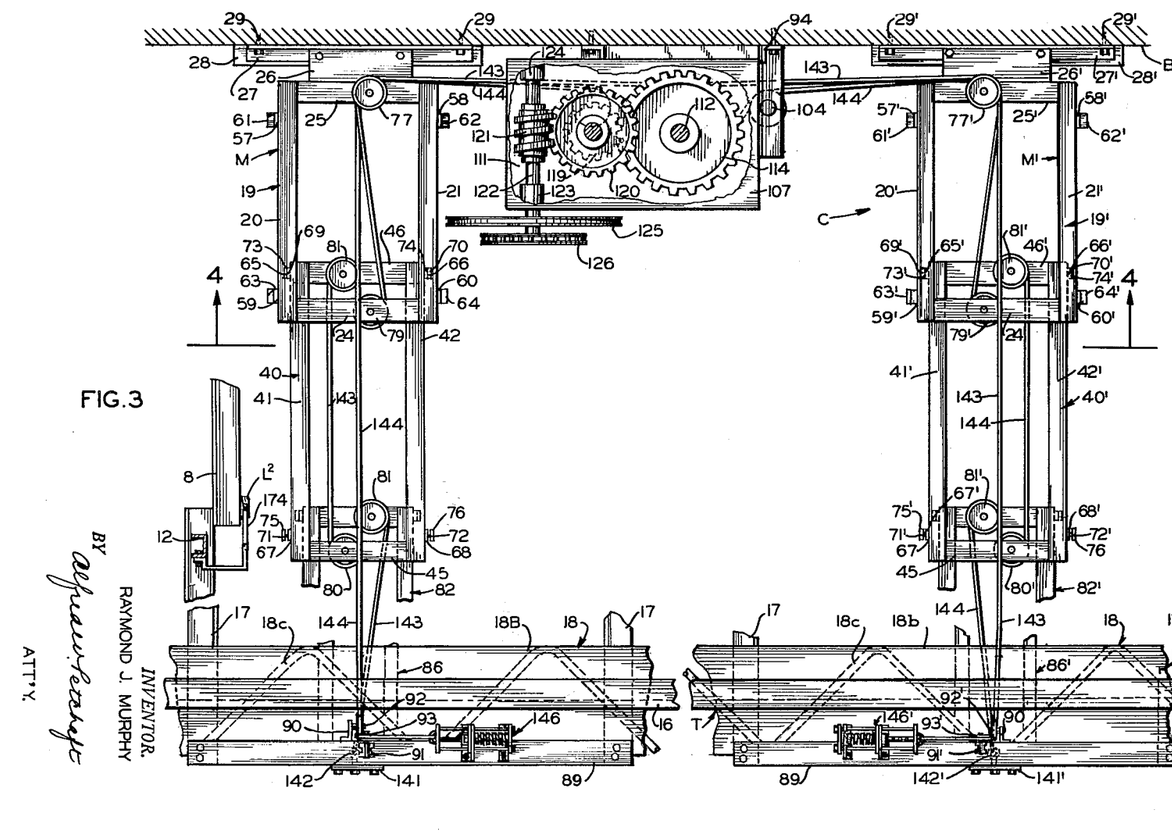
FIG. 3 is a fragmentary sectional view taken along line 3—3 of FIG. 2 and showing the telescoping gym seats and mover in the fully extended position.
Figure 4:
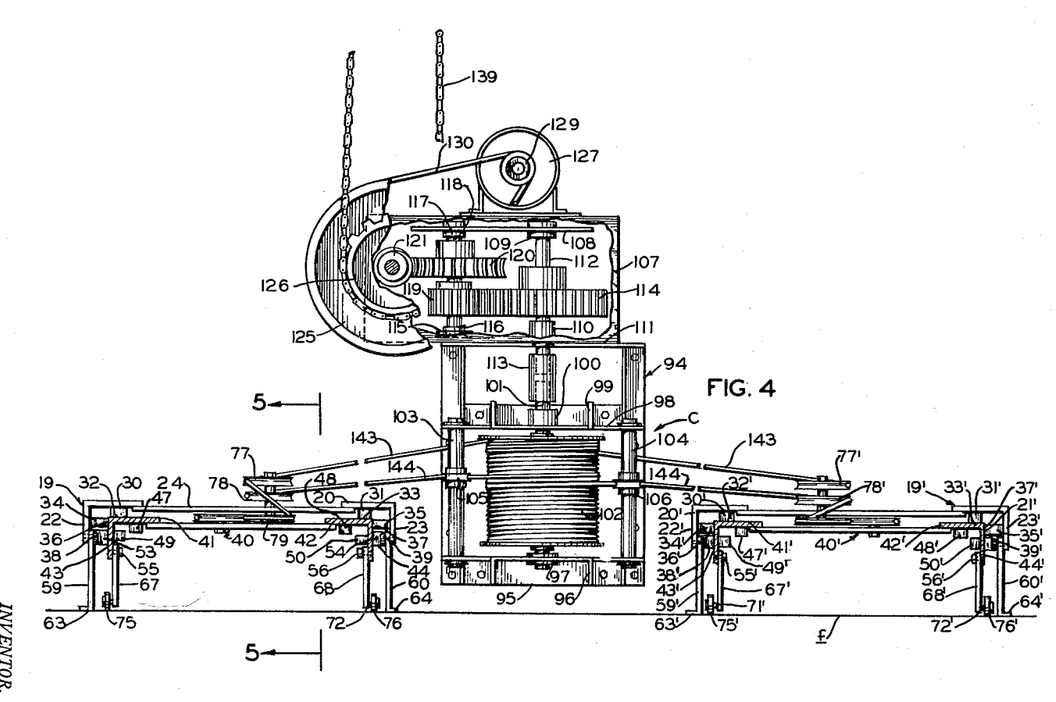
FIG. 4 is a fragmentary sectional view taken along line 4—4 of FIG. 3.
Figures 5, 6, 7, 8:
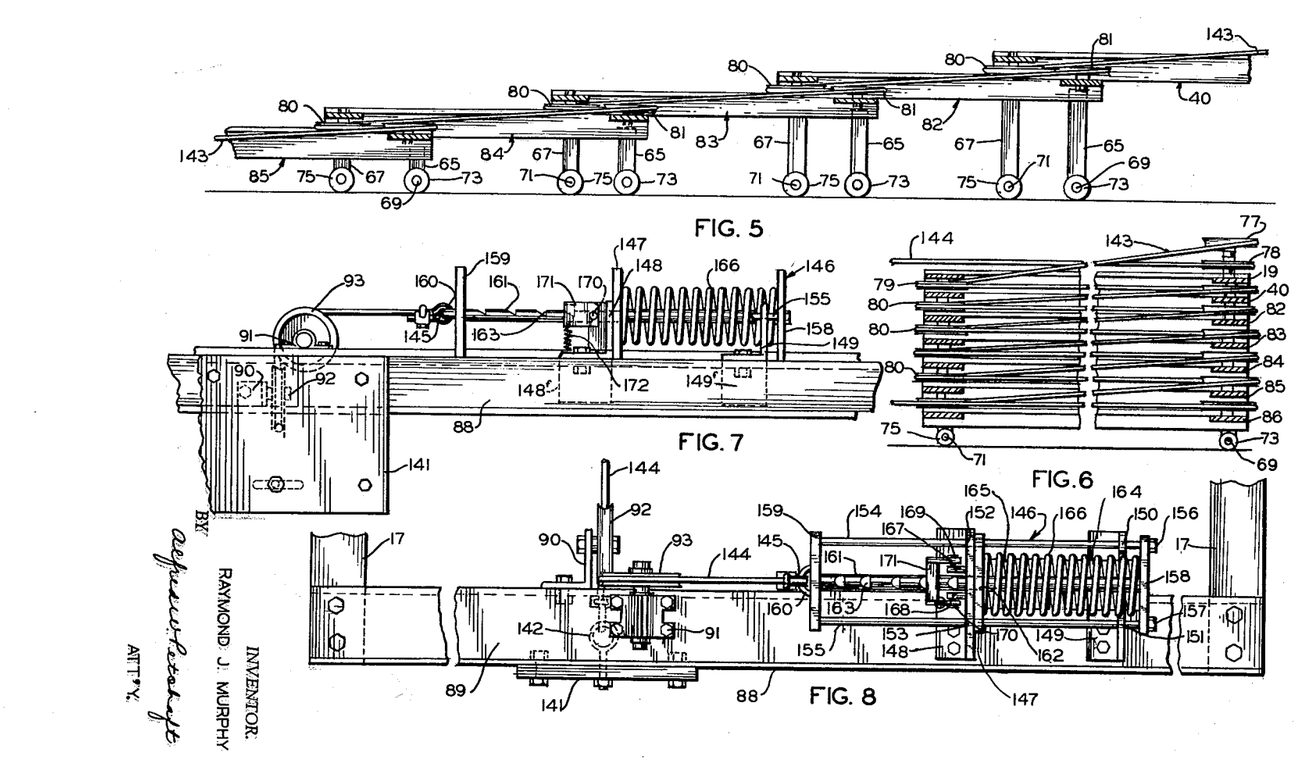
FIG. 5 is a fragmentary sectional view taken along line 5—5 of FIG. 4.
FIG. 6 is a fragmentary sectional view similar to FIG. 5 and showing the mover in the fully closed or retracted position.
FIG. 7 is a fragmentary front elevational view of the mover and showing the cable tensioning mechanism forming part of the present invention.
FIG. 8 is a fragmentary top plan view of the portion of the gym seat mover shown in FIG. 7.
Figure 10:
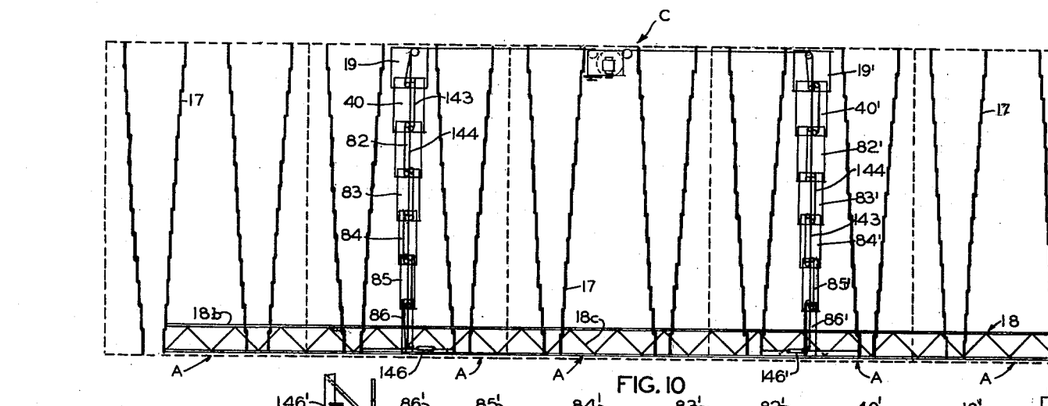
FIG. 10 is a diagrammatic view showing the mover and bleachers in the extended position.
Figure 11:
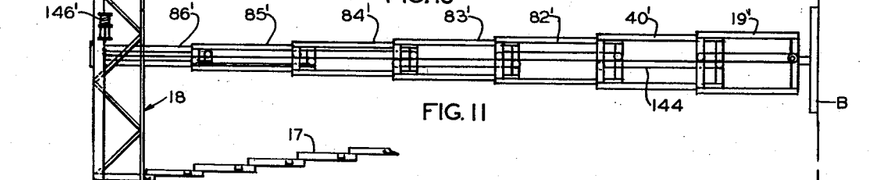
FIG. 11 is a fragmentary top plan view showing one of the mover units in the fully extended position.
Figure 12:
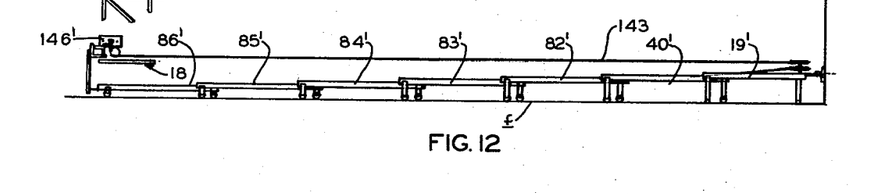
FIG. 12 is a fragmentary side elevational view of one of the gym seat mover units in fully extended position.

Mounted on the depending plate 60 is a closed-position limit switch $L^1$ (FIG. 2) which is adapted to be operated by an actuator arm 173 mounted on and depending from the lowermost tier T, and similarly mounted on one of the foot-forming frame 8 (FIG. 3) is an open position limit switch $L^2$ which is adapted to be contacted by an actuator 174, preferably secured to the panel 12. Since the limit switches are conventional they are not shown or described in detail.

In use, a conventional forward and reverse type of switch can be located at any convenient point within the gymnasium or auditorium and can be manually actuated to energize the motor 127. If the seating-structures A are in the fully closed position the switch can be actuated to operate the motor 127 in the "forward" direction so as to cause the drum 102 to rotate counterclockwise as viewed from FIG. 3. This causes the cable 143 to be fed off one side of the drum 102 and at the same time wind on the drum 102 from the other side. The end of the cable 143 which is attached to the slack take-up device 146′ is then moved forwardly while the other end of the cable 143, which is attached to the eyelet 142 through the forward and rearward pulleys 80, 81, is pulled inwardly toward the wall B, thereby pulling open the extensible frames 40, 82, 83, 84, 85, 86 on the mover unit M in successive order.

Similarly, the rotation of the drum 102 will simultaneously cause the cable 144 to be fed off one side of the drum 102 and at the same time wind on the drum from the other side. The end of the cable 144 which is attached to the eyelet 142′ will be pulled inwardly toward the wall B while the other end of the cable 144 which is attached to the slack take-up device 146 will move forwardly, thereby opening the extensible frames 40′, 82′, 83′, 84′, 85′, 86′, on the mover unit M′ in successive order, simultaneously with, and along a path parallel to, the path of movement of the extensible frames on the mover M. Each of the extensible frames in the mover units M, M′, move outwardly in successive order until the stop abutments 53, 54, 53′, 54′ contact the stop-forming studs 38, 39, 55, 56, 38′, 39′, 55′, 56′, so that as the extensible frames reach the full extent of their travel they will pull the adjacent frame outwardly. At the same time the several frames of all the seating-structures A will be moved open in successive order by the mover units M, M′. The lowermost tiers T will move outwardly first to the full extent of their travel with respect to the adjacent tiers, and as soon as the first tiers T are moved out to their full extent they begin to pull the second tiers outwardly. Furthermore, since the several seating-structures A are cross-connected at their first tiers T by the truss-like beam 18, and the forwardmost extensible frames 86, 86′ on the mover units M, M′ are connected to the tiers T of the seating-structures A on either side of the center seating-structure, the several seating-structures A will all telescope outwardly together with the corresponding tiers or frames in each structure being in endwise alignment.

The several extensible frames in the mover units M, M′ will, of course, move outwardly until the actuator 174 strikes the limit switch L², whereupon the motor 127 will stop. When it is desired to retract the mover units M, M′, the switch control is actuated to reverse the direction of the motor 127 and drum 102 which pulls the ends of the cables 143, 144 attached to the slack take-up devices 146, 146′ inwardly toward the wall B successively closing the extensible frames and seating-structures. As this is done the other cables 143, 144 will be taken up in the convolutions around the forward and rearward pulleys 78, 79, 80, 81, 78′, 79′, 80′, 81′, and when the mover units M, M′ reach the closed position the actuator 173 will strike the limit switch L¹ and shut off the motor 127.

In connection with the present invention it should be noted that the forward and rearward pulleys 78, 79, 80, 81, 78′, 79′, 80′, 81′ are lengthwise aligned of each mover unit M, M′ so that the runs of the cables 143, 144 trained around said pulleys will be parallel to the longitudinal axis of each mover M, M′ with the result that there are no lateral forces imposed on the extensible frames therein as the cables 143, 144 are operated by the drum 102. Consequently, the extensible frames in mover units M, M′ will move in true straight lines which are parallel to each other. Furthermore, the cables 143, 144 do not change level going from one extensible frame to the other, but the level change is effected between front and rear pulleys 78, 79, 80, 81, 78′ 79′, 80′, 81′ so that the elongating and contracting relative movements of the extensible frames will not tend to cause the cable to jump off of any of these pulleys.

It will also be noted that since both ends of the cables 143, 144 are fastened at the front tiers T to the eyelets 142, 142′ and slack take-up devices 146, 146′, the cables 143, 144 will at all times be wound around the drum 102. Consequently, the mover units M, M′ are each, in effect, self-locking with the result that if the motor 127 is stopped, the mover units M, M′ will remain immovably in such position. This allows all the seating-structures A to be held immovably in the fully or partially opened position.

As previously pointed out, in case of electrical power failure or failure of the motor 127 to function, the end 139 of the hand crank 140 may be inserted in the socket 138 and rotated in order to partially or fully extend the mover units M, M′ and seating-structures A.

Figure 13:
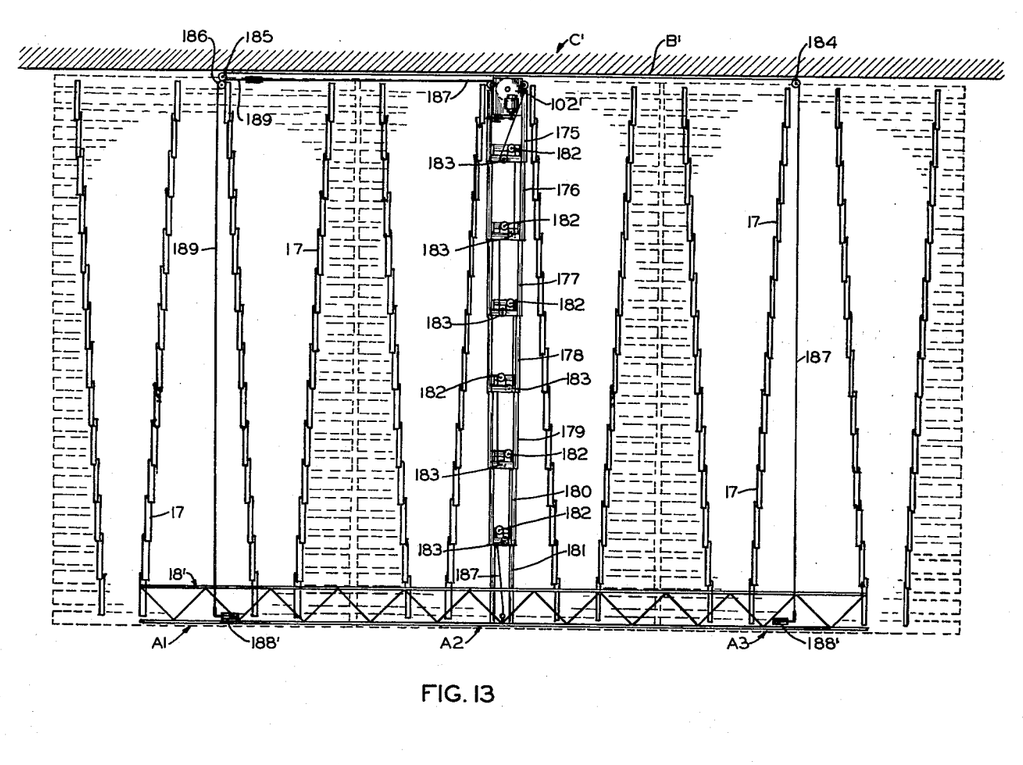
FIG. 13 is a diagrammatic view of a modified form of gym seat mover shown in the extended position.

It is also possible to provide a modified form of gymnasium seat mover C′, as diagrammatically shown in FIG. 13, which comprises a guide frame 175 and a plurality of extensible frames 176, 177, 178, 179, 180, 181, having forward and rearward pulleys 182, 183, all similar to the corresponding elements in the mover unit M, previously described. Also provided for use with the mover C′ is a rotatable drum 102′ which may be suitably driven through a motor and transmission of the type previously described. The mover C′ is preferably used with three adjacent telescoping seating-structures $A_1$, $A_2$, $A_3$ which are cross-connected at their forwardmost tiers by a truss-like beam 18′ and the forwardmost extensible frame 181 is connected to the front tier of the center seating-structure $A_2$. Mounted on the wall B′ somewhat centrally of the outside seating-structures $A_1$, $A_3$ are pulleys 184, 185 and mounted on the main frame of the seating-structure $A_1$ adjacent the pulley 185 is an additional pulley 186. Connected at its forward end to the extensible frame 181 is a cable 187 which is trained around the pulleys 182, 183 in a continuous serpentine course and also around the drum 102′ and pulleys 184, 185. The cable 187 is also connected to the front tier of the seating-structure $A_3$ through a slack take-up device 188 which is similar to the slack take-up devices 146, 146′. Clamped to the cable 187 is an auxiliary cable 189 which is trained around the pulley 186 and extends forwardly within the seating structure $A_1$ and is connected to the front tier thereof by a slack take-up device 188′.

When the drum 102′ is rotated in one direction the ends of the cables 187, 189 attached to the slack take-up devices 188, 188′ will move outwardly while at the same time the end of the cable affixed to the extensible frame 181 will be pulled inwardly and thereby extend the frames in the mover C′ which, in turn, simultaneously open all three seating-structures $A_1$, $A_2$, $A_3$. Reverse rotation of the drum 102′ will pull the ends of the cables attached to the slack take-up devices 188, 188′ inwardly toward the wall B′ and the convolutions in the cable 187 will be taken up by the pulleys 182, 183. This retracts the extensible frames 176, 177, 178, 179, 180, 181 and the seating-structures $A_1$, $A_2$, $A_3$.

The seat movers C, C′ are not limited to use with the particular type of telescoping seating-structures as above described, but are equally capable of being adapted to many types of folding gymnasium seating-structures which can be pushed outwardly from a closed position against the wall wherein the structural support-frames lie in nested relation to an open position extending outwardly into the the gymnasium. The seat movers C, C′ are relatively low and flat and, therefore, do not take up a great deal of space in comparison to the overall size of the seating-structures.

It should also be noted that as the several seating-structures A are shifted to and from open and closed position by the seat mover C, the seating-structures A will telescope inwardly and outwardly along paths which are truly perpendicular to the wall B, thereby preventing marginal interference between adjacent seating-structures A. Similarly in the seat mover C′, the cables 187, 189 are connected to the outside seating-structures $A_1$, $A_3$ and extend rearwardly from the slack take-up devices 188, 188′, so as to be movable along a path perpendicular to the wall B′ when the drum 102′ rotates. Consequently, the seating-structures $A_1$, $A_2$, $A_3$ move along paths perpendicular to the wall B′ and nonperpendicular movement or "crabbing" of the end seating-structures $A_1$, $A_3$ is prevented as the three seating-structures $A_1$, $A_2$, $A_3$ are opened and closed.

It should be understood that changes and modifications in the form, construction, arrangement, and combination of the several parts of the multiple-unit power actuated movers for telescoping gymnasium seat-structures may be made and substituted for those herein shown and described without departing from the nature and principle of my invention.

Having thus described my invention, what I claim and desire to secure by Letters Patent is:

1. A mover in combination with a plurality of foldable side-by-side seating-structures rigidly connected at their forward ends and adapted to shift horizontally across a floor or similar support from a closed position against the wall to an open position in which the seating-structures extend outwardly from the wall; said mover being sized for operative disposition substantially within the confines of said seating-structures in the closed position and comprising a pair of spaced cable-operated telescoping mover unit means, a rotatable drum, a first cable operatively connected with one of the mover unit means and also wrapped around the drum, a second cable operatively connected with the other mover unit means and also wrapped around the drum but in a direction opposite to that of the first cable, a rigid cross-member extending transversely between and connected to each of the mover unit means, first and second slack take-up devices mounted on said cross-member, said first cable being secured to the cross-member at one end adjacent said one of the mover unit means and to the first slack take-up device at the other end adjacent said other of the mover unit means, said second cable being secured to the cross-member at one end adjacent said other of the mover unit means and to the second slack take-up device at the other end adjacent said one of the mover unit means, and power-driven means for rotating said drum selectably in a clockwise or counter-clockwise direction whereby to alternately open and close said side-by-side structures in unison.

2. A mover in combination with a plurality of foldable side-by-side seating structures according to claim 1 wherein, in addition to said power-driven means for rotating said drum, independent manually operable means is provided for rotating said drum.

3. A mover in combination with a plurality of foldable side-by-side seating-structures rigidly connected at their forward ends and adapted to shift horizontally across a floor or similar support from a closed position against the wall to an open position in which the seating-structures extend outwardly from the wall, said mover being sized for operative disposition substantially within the confines of said seating-structures in the closed position and comprising a pair of spaced mover units each provided with a plurality of telescoping frames, the forwardmost telescoping frame in each mover unit being attached one each to one of the seating-structures, each of said frames having forward and rearward end plates, a forward pulley mounted on the underside of each forward end plate, a rearward pulley mounted on the upwardly presented surfaces of each rearward end plate, said forward and rearward pulleys being lengthwise aligned on the alternate telescoping frames, a rotatable drum, a first cable wrapped around the pulleys in one of the mover units in such manner that it is trained around the forward margin of the forward pulley of each frame and around the rearward margin of the rearward pulley of each frame in a continuous serpentine course, said first cable also being wrapped around the drum, a second cable wrapped around the pulleys on the other of the mover units in such manner that it is trained around the forward margin of the forward pulley of each frame and around the rearward margin of the rearward pulley of each frame in a continuous serpentine course, said second cable also being wrapped around the drum but in a direction opposite to that of the first cable, a rigid cross-member extending transversely between and connected to each of the forwardmost frames, first and second slack take-up devices mounted on said cross-member, said first cable being secured to the cross-member at one end and to the first slack take-up device at the other end, said second cable being secured to the cross-member at one end and to the second slack take-up device at the other end so as to be movable with said forwardmost frames, power-driven means for rotating said drum selectably in a clockwise or counterclockwise direction whereby to alternately open and close said side-by-side structures in unison, and manually operable means completely independent of said power-driven means for optionally rotating said drum in either clockwise or counterclockwise direction.

References Cited in the file of this patent

UNITED STATES PATENTS

| | | |
|---|---|---|
| 524,476 | Austin | Aug. 14, 1894 |
| 1,721,020 | Hayman | July 16, 1929 |
| 2,042,674 | Martin | June 2, 1936 |
| 2,251,466 | Payson | Aug. 5, 1941 |
| 2,378,749 | Brown | June 19, 1945 |
| 2,634,462 | Graven | Apr. 14, 1953 |
| 2,692,169 | Phillips | Oct. 19, 1954 |
| 2,732,251 | Meaker | Jan. 24, 1956 |
| 2,809,804 | Sheard | Oct. 15, 1957 |
| 2,815,541 | Lappin | Dec. 10, 1957 |
| 2,817,121 | Mackintosh | Dec. 24, 1957 |
| 2,817,122 | Walworth | Dec. 24, 1957 |
| 2,843,186 | Spencer | July 15, 1958 |
| 2,846,738 | Walworth | Aug. 12, 1958 |
| 2,851,179 | Vance | Sept. 9, 1958 |
| 2,870,492 | Chervenka | Jan. 27, 1959 |
| 2,898,639 | Murphy | Aug. 11, 1959 |

FOREIGN PATENTS

| | | |
|---|---|---|
| 154,709 | Australia | Jan. 11, 1954 |

OTHER REFERENCES

Medart Catalog A.I.A., File No. 35–F–11, pub. Medart Products, St. Louis, copyright 1955, pages 4 and 5.

Medart Advertisement, pub. Medart Products, St. Louis, copyright 1957.